United States Patent
Takahashi et al.

(10) Patent No.: US 11,817,245 B2
(45) Date of Patent: Nov. 14, 2023

(54) SOFT MAGNETIC POWDER

(71) Applicant: Murata Manufacturing Co., Ltd., Kyoto (JP)

(72) Inventors: Toru Takahashi, Nagaokakyo (JP); Kazuhiro Henmi, Nagaokakyo (JP); Noriharu Yodoshi, Sendai (JP); Akihiro Makino, Sendai (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 1611 days.

(21) Appl. No.: 15/882,476

(22) Filed: Jan. 29, 2018

(65) Prior Publication Data

US 2018/0147625 A1 May 31, 2018

Related U.S. Application Data

(63) Continuation of application No. PCT/JP2016/072054, filed on Jul. 27, 2016.

(30) Foreign Application Priority Data

Jul. 31, 2015 (JP) .................................. 2015-152759

(51) Int. Cl.
  *B22F 1/00* (2022.01)
  *B22F 9/08* (2006.01)
  (Continued)

(52) U.S. Cl.
  CPC ................ *H01F 17/04* (2013.01); *B22F 1/05* (2022.01); *B22F 1/08* (2022.01); *B22F 5/00* (2013.01); *B22F 9/082* (2013.01); *C22C 38/002* (2013.01); *C22C 38/02* (2013.01); *C22C 38/08* (2013.01); *C22C 38/10* (2013.01); *C22C 38/16* (2013.01); *C22C 45/02* (2013.01); *H01F 1/14741* (2013.01); *H01F 1/15308* (2013.01); *H01F 1/15375* (2013.01); *H01F 27/255* (2013.01); *H01F 27/28* (2013.01); *B22F 2005/004* (2013.01); *B22F 2009/0824* (2013.01); *B22F 2301/35* (2013.01); *B22F 2304/10* (2013.01); *B22F 2998/10* (2013.01); *B22F 2999/00* (2013.01); *C22C 2200/02* (2013.01); *C22C 2202/02* (2013.01); *H02K 1/02* (2013.01)

(58) Field of Classification Search
  None
  See application file for complete search history.

(56) References Cited

FOREIGN PATENT DOCUMENTS

| CN | 1487536 A | 4/2004 |
|---|---|---|
| CN | 102489711 A | 6/2012 |

(Continued)

OTHER PUBLICATIONS

Machine translation of CN104681227A. (Year: 2015).*

(Continued)

*Primary Examiner* — Xiaowei Su
(74) *Attorney, Agent, or Firm* — Studebaker & Brackett PC

(57) ABSTRACT

A soft magnetic powder according to the present disclosure comprises a particle having no hollow part as a main component, wherein a number of hollow particle present in a region of 2.5 mm square is 40 or less in a cross section of a molded body obtained by powder-compacting and molding the soft magnetic powder so as to have a volume filling rate of 75% or more and 77% or less (i.e., from 75% to 77%).

23 Claims, 1 Drawing Sheet

(51) Int. Cl.

| | | |
|---|---|---|
| *B22F 5/00* | (2006.01) | |
| *H01F 1/147* | (2006.01) | |
| *H01F 27/255* | (2006.01) | |
| *H01F 27/28* | (2006.01) | |
| *H01F 1/153* | (2006.01) | |
| *H01F 17/04* | (2006.01) | |
| *C22C 45/02* | (2006.01) | |
| *B22F 1/05* | (2022.01) | |
| *B22F 1/08* | (2022.01) | |
| *C22C 38/00* | (2006.01) | |
| *C22C 38/02* | (2006.01) | |
| *C22C 38/08* | (2006.01) | |
| *C22C 38/10* | (2006.01) | |
| *C22C 38/16* | (2006.01) | |
| *H02K 1/02* | (2006.01) | |

(56) References Cited

FOREIGN PATENT DOCUMENTS

| CN | 104681227 A | 6/2015 |
|---|---|---|
| JP | S61-96016 A | 5/1986 |
| JP | H08-260114 A | 10/1996 |
| JP | 2001-297766 A | 10/2001 |
| JP | 2008-106301 A | 5/2008 |
| JP | 2008-248306 A | 10/2008 |
| JP | 2009-117484 A | 5/2009 |
| JP | 2012-136770 A | 7/2012 |
| JP | 2015-106593 A | 6/2015 |

OTHER PUBLICATIONS

Machine translation of CN 1487536A. (Year: 2004).*
International Search Report issued in PCT/JP2016/072054; dated Oct. 18, 2016.
Written Opinion issued in PCT/JP2016/072054; dated Oct. 18, 2016.
Isao Endo et al.; "Production of Amorphous Soft Magnetic Powders by the New Water Atomization Process "SWAP""; Journal of the Japan Society of Powder and Powder Metallurgy; Aug. 2001; pp. 697-702; vol. 48, No. 8.
An Office Action mailed by the Chinese Patent Office dated Apr. 1, 2019, which corresponds to Chinese Patent Application No. 201680044417.5 and is related to U.S. Appl. No. 15/882,476 with English language translation.
An Office Action; "Notification of Reasons for Refusal," issued by the Japanese Patent Office dated Sep. 5, 2018, which corresponds to Japanese Patent Application No. 2017-532528 and is related to U.S. Appl. No. 15/882,476; with English language translation.

* cited by examiner

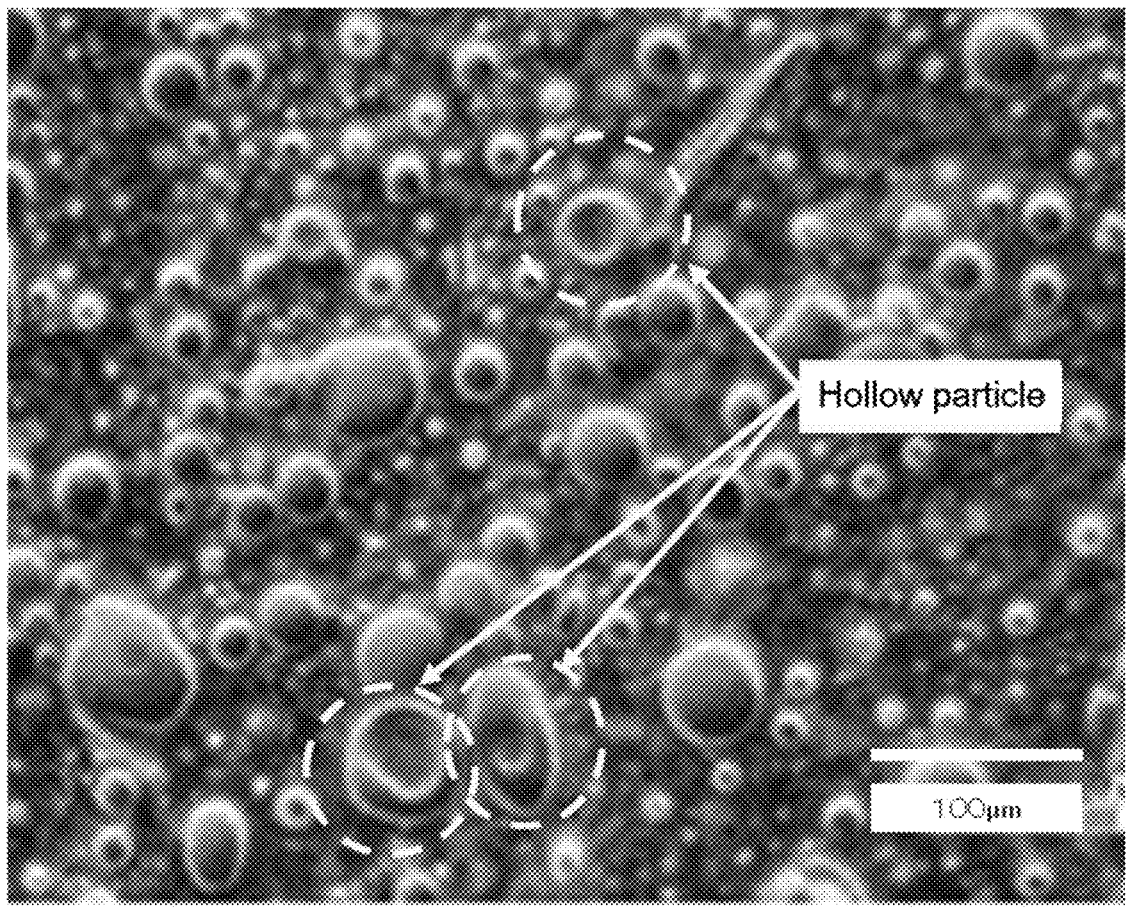

SOFT MAGNETIC POWDER

CROSS-REFERENCE TO RELATED APPLICATIONS

This application claims benefit of priority to International Patent Application No. PCT/JP2016/072054, filed Jul. 27, 2016, and to Japanese Patent Application No. 2015-152759, filed Jul. 31, 2015, the entire contents of each are incorporated herein by reference.

TECHNICAL FIELD

The present disclosure relates to a soft magnetic powder and a method for manufacturing the same.

BACKGROUND ART

A soft magnetic powder having an amorphous structure is widely used in applications such as magnetic core materials for coil components used for electronic devices. As a method for manufacturing the soft magnetic powder, it is known, for example, that a method of preparing a soft magnetic Fe—Si—B—C alloy by a water atomization process using a rapidly spinning water flow (SWAP, Spinning Water Atomization Process) (See a document by Isao Endo et al., entitled Production of Amorphous Soft Magnetic Powders by the New Water Atomization Process "SWAP", Journal of the Japan Society of Powder and Powder Metallurgy, August 2001, Vol. 48, No. 8, p. 697-702, referred to herein as "the Endo et al. document"). According to the method described in the Endo et al. document, an amorphous alloy powder is prepared by finely dividing with a gas jet a molten alloy taken out from a bottom part of a crucible, spraying the molten alloy into a rapidly spinning water flow and solidifying it by use of a SWAP apparatus composed of a vacuum melting part, a molten metal dividing part by high-pressure gas jet, a rapidly-spinning water flow part in cylindrical container and a powder recovery part.

SUMMARY

However, the present inventors made a study and found out that the soft magnetic powder obtained by the conventional method tended to comprise a large number of hollow particles. When the soft magnetic powder comprising a large number of hollow particles is used as a magnetic core material for a coil component, a problem of increase in power loss (core loss) arises.

An object of the present disclosure is to provide a soft magnetic powder having a reduced content of hollow particle which can reduce a core loss when used as a magnetic core material, and a method for manufacturing the soft magnetic powder.

The present inventors made intensive studies and thus found that the number of the hollow particle contained in the soft magnetic powder can be reduced by appropriately controlling a ratio of a flow rate of a molten metal of a mother alloy and a flow rate of a jet gas when manufacturing the soft magnetic powder by a gas atomization process, and finally accomplished the present disclosure.

According to a first aspect of the present disclosure, there is provided a soft magnetic powder comprising a particle having no hollow part as a main component, wherein a number of hollow particle present in a region of 2.5 mm square is 40 or less in a cross section of a molded body obtained by powder-compacting and molding the soft magnetic powder so as to have a volume filling rate of 75% or more and 77% or less (i.e., from 75% to 77%).

According to a second aspect of the present disclosure, there is provided a method for manufacturing a soft magnetic powder by pulverizing a molten metal of a mother alloy with a jet gas by a gas atomization process to form the soft magnetic powder, wherein a value of a flow rate of the molten metal (weight basis) divided by a flow rate of the jet gas (volumetric basis) is 3.1 g/L or less.

According to a third aspect of the present disclosure, there is provided a coil component comprising a magnetic body part which comprises the soft magnetic powder described above and a resin, and a coil conductor embedded in the magnetic body part, wherein a content of the soft magnetic powder in the magnetic body part is 60% by volume or more.

According to a fourth aspect of the present disclosure, there is provided a coil component comprising a magnetic core which comprises the soft magnetic powder described above and a resin, and a coil conductor wound around the magnetic core, wherein a content of the soft magnetic powder in the magnetic core is 60% by volume or more.

The soft magnetic powder according to the present disclosure has an advantage that it has a low content of hollow particle. The method for manufacturing the soft magnetic powder according to the present disclosure can provide a soft magnetic powder having a reduced content of hollow particle and capable of reduce a core loss when used as a magnetic core material since the method has the above-described configuration. The coil component according to the present disclosure can reduce a core loss since the coil component has the above-described configuration.

BRIEF DESCRIPTION OF THE DRAWING

The FIGURE is a microscope photograph of a cross section of a molded body prepared by use of a soft magnetic powder of example 5.

DETAILED DESCRIPTION

Embodiments of the present disclosure will be described below. However, the following embodiments are intended for the purpose of illustration, and the present disclosure is not limited to the following embodiments.

A soft magnetic powder according to one embodiment of the present disclosure comprises a particle having no hollow part as a main component. In other words, the soft magnetic powder according to this embodiment has a reduced content of hollow particle. In the present specification, "hollow particle" means a particle which has a hollow part in its inside. The content of the hollow particle in the soft magnetic powder according to this embodiment can be evaluated by a number of hollow particle(s) in a cross section of a molded body which is obtained by powder-compacting and molding the soft magnetic powder so as to have a predetermined volume filling rate as described below. In the soft magnetic powder according to this embodiment, the number of the hollow particle present in a region of 2.5 mm square is 40 or less in a cross section of a molded body obtained by powder-compacting and molding the soft magnetic powder so as to have a volume filling rate of 75% or more and 77% or less (i.e., from 75% to 77%). It should be noted that a preparation of the molded body and a measurement of the number of the hollow particle are conducted for the evaluation of the content of the hollow particle in the soft magnetic powder, and do not define a volume filling rate of a product prepared from the soft magnetic powder according to the present disclosure in any sense. The soft magnetic powder according to this embodiment can be applied to a product having arbitrary volume filling rate.

First, the soft magnetic powder is powder-compacted and molded so as to have a volume filling rate of 75% or more and 77% or less (i.e., from 75% to 77%) to obtain a molded body. Specifically, the soft magnetic powder and a resin such as a silicone resin is mixed at a predetermined ratio, and the mixture is press-molded at a pressure of about 100 MPa to obtain a molded body. The shape of the molded body is not particularly limited, and may be a disk having an outer diameter of 10 mm and a thickness of 2.5 mm, for example. The molded body obtained by the press-molding is cured by a heat treatment to obtain the molded body having a volume filling rate of 75% or more and 77% or less (i.e., from 75% to 77%). The volume filling rate is a value of a density, which is evaluated by measuring an outer diameter and a weight of the molded body, divided by an absolute specific gravity of the soft magnetic powder. The absolute specific gravity of the soft magnetic powder can be evaluated by Archimedes method.

A surface of the molded body is polished by about 0.5 mm in a thickness direction to expose a cross section. A photograph of the cross section is taken by a microscope or the like. A magnification of the microscope is preferably about 100×. In the obtained photograph, a region of 2.5 mm square (area of 6.25 mm$^2$) is selected at random, and a number of hollow particle present in the region is measured. The number of the hollow particle can be measured by visual observation. In the cross section of the molded body, the number of the hollow particle present in the region of 2.5 mm square (area of 6.25 mm$^2$) is 40 or less. The hollow particle in the soft magnetic powder causes an increase in a core loss when the soft magnetic powder is used as a magnetic core material. When the number of hollow particle is 40 or less, the core loss can be reduced, and an excellent soft magnetic property can be obtained.

As described above, the number of the hollow particle in the soft magnetic powder according to this embodiment is defined by use of the molded body having a volume filling rate of 75% or more and 77% or less (i.e., from 75% to 77%). However, it is possible to define the number of the hollow particle even by use of a molded body having a volume filling rate outside the range described above. Specifically, the number of the hollow particle can be obtained by evaluating an area of the resin component and an area of the soft magnetic powder in a cross section of the molded body by an image analysis, and conducting a conversion into the volume filling rate of 75% or more and 77% or less (i.e., from 75% to 77%) based on the values of the areas. In this embodiment, the number of the hollow particle present in the region of 2.5 mm square is defined. However, it is not intended to limit the area of the region where the number of the hollow particle is measured, and the number of the hollow particle may be evaluated by converting the number of the hollow particles which is measured in a region having arbitrary area into that in the area of 2.5 mm square (area of 6.25 mm$^2$).

A mechanism of reduced content of the hollow particle in the soft magnetic powder according to this embodiment is not bound by any theory while it is considered to be as described below. The soft magnetic powder according to this embodiment is obtained by pulverizing at high pressure a molten metal of a mother alloy with a jet gas as described later. In this case, the hollow particle is considered to be formed by the jet gas being dragged into the molten metal during the pulverization. The soft magnetic powder according to this embodiment can be prevented from dragging the jet gas thereinto by appropriately controlling a flow rate of the molten metal and a flow rate of the jet gas. As a result, the number of the hollow particle can be reduced.

The soft magnetic powder according to this embodiment preferably comprises an alloy composition comprising Fe as a main component. The alloy composition may comprise Co and/or Ni in addition to Fe. A sum of contents of Fe, Co and Ni in the alloy composition is preferably 72 atom % or more and 85 atom % or less (i.e., from 72 atom % to 85 atom %) where the contents of Co and/or Ni may be 0 atom %. The soft magnetic powder according to this embodiment preferably comprises an amorphous structure. When the soft magnetic powder has the composition described above, the core loss can be further reduced.

The soft magnetic powder preferably has an average particle diameter of 10 μm or more and 70 μm or less (i.e., from 10 μm to 70 μm). When the average particle diameter is too small, it may be difficult to manufacture the soft magnetic powder by the gas atomization process. When the average particle diameter is 10 μm or more, the soft magnetic powder can be easily prepared by the gas atomization process. On the other hand, when the average particle diameter is too large, a content of skewed deformed particle having a low degree of sphericity may be increased, and as a result, a handling property thereof may be deteriorated. When the average particle diameter is 70 μm or less, a particle having a high degree of sphericity can be easily obtained, and as a result, the handling property can be improved. The average particle diameter of the soft magnetic powder can be measured by a dry-type laser diffraction particle size distribution meter.

Then, a method for manufacturing a soft magnetic powder according to one embodiment of the present disclosure will be described below. The method for manufacturing the soft magnetic powder according to this embodiment is a method for manufacturing a soft magnetic powder by pulverizing a molten metal of a mother alloy with a jet gas by a gas atomization process to form the soft magnetic powder, wherein a value of a flow rate of the molten metal (weight basis) divided by a flow rate of the jet gas (volumetric basis) is 3.1 g/L or less.

First, the mother alloy having a predetermined composition is prepared. The mother alloy having an uniform composition can be obtained by melting a raw material such as Fe, FeSi alloy and FeB alloy in a crucible, and cooling it. The mother alloy preferably comprises Fe as a main component, and may comprise Co and/or Ni in addition to Fe. A sum of contents of Fe, Co and Ni in the mother alloy is preferably 72 atom % or more and 85 atom % or less (i.e., from 72 atom % to 85 atom %) where the contents of Co and/or Ni may be 0 atom %. When the mother alloy has the composition described above, the soft magnetic powder which can reduce the core loss when used as the magnetic core material can be obtained.

Next, an interior of a gas atomization device is set to an atmosphere of an inert gas such as argon gas and nitrogen gas. The interior may be set to a mixed gas atmosphere in which hydrogen gas is added to the inert atmosphere. Oxidation of the metal (alloy) can be suppressed by adding hydrogen gas. For example, the interior of the gas atomization device may be set to a mixed gas atmosphere of argon gas to which hydrogen gas is added by 3% in terms of partial pressure.

The mother alloy is crushed to a size of about 5 mm with which the mother alloy is easily melted. The crashed mother alloy is put into a crucible of the gas atomization device, heated and melted by high-frequency induction heating to obtain the molten metal. Then, the jet gas is sprayed into the molten metal to pulverize the molten metal in the mixed gas atmosphere described above to obtain the alloy powder. At this time, the flow rate of the molten metal and the flow rate of the jet gas are set so that the value $M_M/M_J$ of the flow rate of the molten metal $M_M$ (weight basis) divided by the flow rate of the jet gas $M_J$ (volume basis) is 3.1 g/L or less. According to the study by the present inventors, the hollow particle is considered to be generated by high-pressure water or high-pressure gas being dragged into unsolidified molten metal. In particular, when high-pressure water is used to pulverize the mother alloy, the number of the hollow particle is increased due to an evaporation of water. Therefore, when the soft magnetic powder manufactured by use of high-pressure water is used as the magnetic core material, the increase of the core loss can be remarkable. Also, when the flow rate of the jet gas is too large compared to the flow rate of the molten metal, the dragging of the jet gas into the molten metal is likely to occur, and the hollow particle is likely to be formed. In the method for manufacturing the soft magnetic powder according to this embodiment, the dragging of the jet gas into the molten metal can be suppressed by using the jet gas for pulverizing the mother alloy and further by controlling the flow rate of the molten metal and the flow rate of the jet gas as described above, and thus, the number of the hollow particle can be reduced. As a result, when the obtained soft magnetic powder is used as the magnetic core material, the core loss can be reduced, and the excellent soft magnetic property can be obtained. The value $M_M/M_J$ of the flow rate of the molten metal $M_M$ (weight basis) divided by the flow rate of the jet gas $M_J$ (volume basis) is preferably 0.1 g/L or more and 2.0 g/L or less (i.e., from 0.1 g/L to 2.0 g/L). When the value of $M_M/M_J$ is 0.1 g/L or more, the soft magnetic powder can be manufactured at a low cost. When the value of $M_M/M_J$ is 2.0 g/L or less, the number of the hollow particle can be further reduced.

The flow rate of the molten metal of the mother alloy and the flow rate of the jet gas are not particularly limited as long as the value of the flow rate of the molten metal (weight basis) divided by the flow rate of the jet gas (volume basis) is within the range described above, and can be set appropriately according to a device to be used. For example, the flow rate of the molten metal of the mother alloy may be 10 g/second or more and 50 g/second or less (i.e., from 10 g/second to 50 g/second), and the flow rate of the jet gas may be 10 L/second or more and 50 L/second or less (i.e., 10 L/second to 50 L/second). When a plurality of molten metal nozzles are arranged in the gas atomization device, the flow rate of the molten metal and the flow rate of the jet gas for each of the individual molten metal nozzles may be within the range described above.

The jet gas preferably comprises an inert gas. When the jet gas comprises the inert gas, an undesirable reaction such as oxidation of the metal component can be suppressed. The jet gas may comprise, for example, Ar and/or $N_2$. The jet gas may also comprise 0.5% or more and 7% or less (i.e., from 0.5% to 7%) of $H_2$ in terms of partial pressure. When the jet gas comprises $H_2$ of within the range described above, the oxidation of the metal component can be effectively suppressed.

The molten metal of the mother alloy may be rapidly cooled with cooling water after the molten metal of the mother alloy is pulverized with the jet gas. By rapidly cooling with cooling water, coarse crystals can be prevented from being formed, and a good magnetic property can be obtained. The soft magnetic powder according to this embodiment is obtained by the pulverization and optionally rapid cooling as described above. The soft magnetic powder may optionally be passed through a sieve (for example, a sieve having an opening of 53 μm) to regulate the particle size.

Next, one embodiment of a coil component using the soft magnetic powder according to the present disclosure as a magnetic core material will be described. The coil component according to this embodiment is a coil component comprising a magnetic body part which comprises the soft magnetic powder described above and a resin, and a coil conductor embedded in the magnetic body part, wherein a content of the soft magnetic powder in the magnetic body part is 60% by volume or more. The coil component according to this embodiment has an excellent soft magnetic property since the coil component uses the soft magnetic powder according to the present disclosure in which the content of the hollow particle is reduced as the magnetic core material. The coil component according to this embodiment can be manufactured by procedures described below, for example. First, a plurality of sheets of a composite material comprising the soft magnetic powder and the resin are formed. Then, the coil conductor is disposed between the sheets. The sheets are thermally pressure-bonded in a state where the coil conductor is disposed between the sheets to obtain the coil component comprising the magnetic body part which comprises the soft magnetic powder and the resin, and the coil conductor embedded in the magnetic body part.

Next, another embodiment of the coil component using the soft magnetic powder according to the present disclosure as the magnetic core material will be described. The coil component according to this embodiment is a coil component comprising a magnetic core which comprises the soft magnetic powder described above and a resin, and a coil conductor wound around the magnetic core, wherein a content of the soft magnetic powder in the magnetic core is 60% by volume or more. The coil component according to this embodiment has an excellent soft magnetic property since the coil component uses the soft magnetic powder according to the present disclosure in which the content of the hollow particle is reduced as the magnetic core material. The coil component according to this embodiment can be manufactured by procedures described below, for example. First, the soft magnetic powder and the resin such as a silicone resin, an epoxy resin and a phenol resin are mixed to obtain a mixture. The mixture is press-molded at a predetermined pressure to form the magnetic core. The shape and dimension of the magnetic core are not particularly limited, and the magnetic core may be a toroidal core having an outer diameter of 13 mm, an inner diameter of 8 mm and a thickness of 2.5 mm. The magnetic core is cured by a heat treatment. The coil component comprising the magnetic core and the coil conductor wound around the magnetic core can be formed by winding a copper wire or the like around the cured magnetic core.

A stator core for a motor can also be formed by use of the soft magnetic powder according to the present disclosure. The motor comprises a stator core comprising a plurality of armature teeth disposed at equal intervals on the same circumference, a coil component comprising a coil conductor wound around the armature teeth, and a rotor rotatably disposed inside the coil component. The soft magnetic powder according to the present disclosure has a high saturation magnetic flux density and a low magnetic loss, and thus, a high-quality motor having a low power loss can be obtained by a stator core formed of the soft magnetic powder according to the present disclosure.

EXAMPLES

Soft magnetic powders of examples 1 to 15 were prepared by procedures described below. First, mother alloys prepared so as to have compositions shown in Table 1 were provided. The mother alloys were crushed to a size of about 5 mm. An interior of a gas atomization device was set to a mixed gas atmosphere of argon gas to which hydrogen gas was added by 3% in terms of partial pressure. The crushed mother alloy was put into a crucible of the gas atomization device, heated and melted by the high-frequency induction heating to 1350° C. to obtain the molten metal.

Then, a jet gas was sprayed into the molten metal under the mixed gas atmosphere described above to pulverize the molten metal, and then the alloy powder was obtained. Argon gas was used as the jet gas. In examples 7, 8, 14 and 15, the molten metal was rapidly cooled with cooling water after the molten metal was pulverized with the jet gas (indicated by "gas/water combined atomization" in Table 2). A pressure $P_J$ and a flow rate $M_J$ of the jet gas and a flow rate $M_M$ of the molten metal were set to values shown in Table 2. The value $M_M/M_J$ of the flow rate of the molten metal (weight basis) divided by the flow rate of the jet gas (volume basis) is shown in Table 2. The obtained alloy powders were passed through a sieve having an opening of 53 μm to obtain the soft magnetic powders of examples 1 to 15.

(Measurement of Number of Hollow Particle)

The number of the hollow particle contained in the soft magnetic powder of each of examples 1 to 15 was measured by procedures described below. First, 2 g of each sample was taken, and 3 parts by weight of a silicone resin per 100 parts by weight of the soft magnetic powder (17 parts by volume per 100 parts by volume of the soft magnetic powder) was added to obtain a mixture. The mixture was press-molded at a pressure of 100 MPa to prepare a disk having an outer diameter of 10 mm and a thickness of 2.5 mm. The disk was cured by a heat treatment at 160° C. for one hour to obtain a molded body. The volume filling rate of the soft magnetic powder in the molded body thus obtained was 75% to 77%. The volume filling rate is a value of a density, which is evaluated by measuring the outer diameter and the weight of the molded body, divided by an absolute specific gravity of the soft magnetic powder.

A surface of the molded body was polished by 0.5 mm in a thickness direction to expose a cross section. A photograph of the cross section was taken by a microscope with a magnification of 100×. A region of 2.5 mm square (area of 6.25 mm²) was selected at random in the photograph, and the number of the hollow particles present in the region was counted by visual observation. The number of the hollow particles was counted in two regions for each sample, and the average value of the numbers of the hollow particles in the two regions was calculated. The results are shown in Table 2. A microscope photograph of the cross section of the molded body prepared by use of the soft magnetic powder of example 5 is shown in the FIGURE as a representative.

(Core Loss Measurement)

Toroidal cores were prepared by use of the soft magnetic powders of examples 1 to 15 as the magnetic core materials by procedures described below, and the core losses of the toroidal cores were measured. First, 2 g of each sample was taken, and 3 parts by weight of a silicone resin per 100 parts by weight of the soft magnetic powder (17 parts by volume per 100 parts by volume of the soft magnetic powder) was added to obtain a mixture. The mixture was press-molded at a pressure of 100 MPa to prepare a toroidal core having an outer diameter of 13 mm, an inner diameter of 8 mm and a thickness of 2.5 mm. The toroidal core was cured by a heat treatment at 160° C. for one hour. A copper wire having a diameter of 0.24 mm was wound around the cured toroidal core to prepare a coil component comprising a primary winding wire and a secondary winding wire. Numbers of turns of the primary winding wire and the secondary winding wire were 16 turns, respectively. The core loss of the coil component at an applied magnetic field of 30 mT and a measurement frequency of 1 MHz was determined by use of a B-H analyzer SY-8217 manufactured by Iwatsu Test Instruments Corporation. The results are shown in Table 2. The examples with "*" in Tables 1 and 2 are comparative examples.

TABLE 1

| Example | Composition |
| --- | --- |
| 1 | $Fe_{75.6}Si_9B_{10}P_5Cu_{0.4}$ |
| 2 | $Fe_{75.6}Si_9B_{10}P_5Cu_{0.4}$ |
| 3 | $Fe_{75.6}Si_9B_{10}P_5Cu_{0.4}$ |
| 4 | $Fe_{75.6}Si_9B_{10}P_5Cu_{0.4}$ |
| 5 | $Fe_{75.6}Si_9B_{10}P_5Cu_{0.4}$ |
| 6 | $Fe_{75.6}Si_9B_{10}P_5Cu_{0.4}$ |
| 7 | $Fe_{75.6}Si_9B_{10}P_5Cu_{0.4}$ |
| 8 | $Fe_{75.6}Si_9B_{10}P_5Cu_{0.4}$ |
| 9 | $Fe_{70}Ni_6Si_9B_9P_6$ |
| 10 | $Fe_{70}Co_6Si_9B_9P_6$ |
| 11 | $Fe_{78.3}Si_{5.3}B_{6.8}P_{8.9}Cu_{0.7}$ |
| 12* | $Fe_{75.6}Si_9B_{10}P_5Cu_{0.4}$ |
| 13* | $Fe_{75.6}Si_9B_{10}P_5Cu_{0.4}$ |
| 14* | $Fe_{75.6}Si_9B_{10}P_5Cu_{0.4}$ |
| 15* | $Fe_{75.6}Si_9B_{10}P_5Cu_{0.4}$ |

TABLE 2

| ex. | Atomization process | Jet gas | | | | Number of hollow particle (/6.25 mm²) | Core loss (kW/m³) |
| --- | --- | --- | --- | --- | --- | --- | --- |
| | | $P_J$ (MPa) | $M_J$ (L/sec.) | $M_M$ (g/sec.) | $M_M/M_J$ (g/L) | | |
| 1 | Gas atomization | 1.4 | 14.7 | 13.2 | 0.90 | 7.0 | 1632 |
| 2 | Gas atomization | 3.3 | 16.2 | 12.0 | 0.74 | 8.0 | 1751 |
| 3 | Gas atomization | 4.6 | 33.5 | 13.8 | 0.41 | 11.0 | 1637 |
| 4 | Gas atomization | 3.7 | 21.6 | 6.3 | 0.29 | 8.5 | 1847 |
| 5 | Gas atomization | 3.8 | 15.1 | 33.0 | 2.19 | 25.0 | 1903 |
| 6 | Gas atomization | 4.2 | 18.0 | 55.7 | 3.09 | 37.0 | 1832 |
| 7 | Gas/water combined atomization | 4.0 | 15.4 | 27.5 | 1.79 | 27.0 | 1823 |

TABLE 2-continued

| ex. | Atomization process | Jet gas $P_J$ (MPa) | $M_J$ (L/sec.) | $M_M$ (g/sec.) | $M_M/M_J$ (g/L) | Number of hollow particle (/6.25 mm$^2$) | Core loss (kW/m$^3$) |
|---|---|---|---|---|---|---|---|
| 8 | Gas/water combined atomization | 3.2 | 17.5 | 19.1 | 1.09 | 18.0 | 1767 |
| 9 | Gas atomization | 4.4 | 22.4 | 12.0 | 0.54 | 25.5 | 1556 |
| 10 | Gas atomization | 4.5 | 18.6 | 9.8 | 0.53 | 21.5 | 1625 |
| 11 | Gas atomization | 5.1 | 41.9 | 8.4 | 0.20 | 14.0 | 1911 |
| 12* | Gas atomization | 4.6 | 15.2 | 65.2 | 4.29 | 45.5 | 2373 |
| 13* | Gas atomization | 4.5 | 14.4 | 70.3 | 4.88 | 49.0 | 2132 |
| 14* | Gas/water combined atomization | 4.0 | 16.3 | 62.0 | 3.80 | 54.0 | 2282 |
| 15* | Gas/water combined atomization | 2.5 | 14.4 | 50.5 | 3.51 | 43.0 | 2067 |

As shown in Table 2, in the soft magnetic powders of examples 1 to 11 prepared with the value $M_M/M_J$ of the flow rate of the molten metal divided by the flow rate of the jet gas of 3.1 g/L or less, the number of the hollow particle present in the region of 2.5 mm square was 40 or less. In contrast, in the soft magnetic powders of examples 12 to 15 prepared with the value $M_M/M_J$ of more than 3.1 g/L, the number of the hollow particle present in the region of 2.5 mm square was more than 40. It can be seen from the results that the number of the hollow particles present in the soft magnetic powder could be reduced by controlling the value of $M_M/M_J$ to 3.1 g/L or less.

Also, as shown in Table 2, the coil components prepared by use of the soft magnetic powders of examples 1 to 11 in each of which the number of the hollow particle was 40 or less had low core losses of 2000 kW/m$^3$ or less. In contrast, the coil components prepared by use of the soft magnetic powders of examples 12 to 15 in each of which the number of the hollow particle was more than 40 had core losses of more than 2000 kW/m$^3$. It can be seen from the results that the core loss of the coil component could be reduced by reducing the number of the hollow particles present in the soft magnetic powder and thus an excellent soft magnetic property could be accomplished.

The soft magnetic powder according to the present disclosure can reduce the core loss when used as the magnetic core material, and thus the soft magnetic powder according to the present disclosure can be used for a coil component usable in an electronic device for which high performance is required.

What is claimed is:

1. A soft magnetic powder comprising a particle having no hollow part as a main component, wherein a number of hollow particles present in a region of 2.5 mm square is 40 or less and 7 or more in a cross section of a molded body obtained by powder-compacting and molding the soft magnetic powder so as to have a volume filling rate of 75% to 77%,
    wherein the soft magnetic powder is manufactured by pulverizing a molten metal of a mother alloy with a jet gas by a gas atomization process to form the soft magnetic powder, and
    wherein a weight-basis value of a flow rate of the molten metal divided by a volumetric-basis flow rate of the jet gas is 0.2 g/L or more and 3.1 g/L or less.

2. The soft magnetic powder according to claim 1, wherein the soft magnetic powder comprises an alloy composition comprising Fe as a main component; a sum of contents of Fe, Co and Ni in the alloy composition is 72 atom % to 85 atom % where the contents of Co and/or Ni may be 0 atom %; and the soft magnetic powder comprises an amorphous structure.

3. The soft magnetic powder according to claim 2, wherein the soft magnetic powder has an average particle diameter of 10 μm to 70 μm.

4. A coil component comprising a magnetic body part which comprises the soft magnetic powder according to claim 2 and a resin, and a coil conductor embedded in the magnetic body part, wherein a content of the soft magnetic powder in the magnetic body part is 60% by volume or more.

5. A coil component comprising a magnetic core which comprises the soft magnetic powder according to claim 2 and a resin, and a coil conductor wound around the magnetic core, wherein a content of the soft magnetic powder in the magnetic core is 60% by volume or more.

6. The soft magnetic powder according to claim 2, wherein, in the alloy composition, a content of Fe is 70 atom % to 85 atom %, a content of Ni is 0 atom % to 6 atom %, a content of Co is 0 atom % to 6 atom %, a content of Si is more than 0 atom % and 9 atom % or less, and a content of B is more than 0 atom % and 10 atom % or less.

7. The soft magnetic powder according to claim 2, wherein in the alloy composition, a content of Cu is 0 atom % to 0.7 atom %.

8. The soft magnetic powder according to claim 2, wherein the alloy composition comprises Fe, Si, B, P and Cu.

9. The soft magnetic powder according to claim 2, wherein the alloy composition comprises at least one selected from a group consisting of Fe, Si, B, P, Ni and Co.

10. The soft magnetic powder according to claim 1, wherein the soft magnetic powder has an average particle diameter of 10 μm to 70 μm.

11. A coil component comprising a magnetic body part which comprises the soft magnetic powder according to claim 10 and a resin, and a coil conductor embedded in the magnetic body part, wherein a content of the soft magnetic powder in the magnetic body part is 60% by volume or more.

12. A coil component comprising a magnetic core which comprises the soft magnetic powder according to claim 10 and a resin, and a coil conductor wound around the magnetic core, wherein a content of the soft magnetic powder in the magnetic core is 60% by volume or more.

13. A coil component comprising a magnetic body part which comprises the soft magnetic powder according to claim 1 and a resin, and a coil conductor embedded in the magnetic body part, wherein a content of the soft magnetic powder in the magnetic body part is 60% by volume or more.

14. A coil component comprising a magnetic core which comprises the soft magnetic powder according to claim 1 and a resin, and a coil conductor wound around the magnetic core, wherein a content of the soft magnetic powder in the magnetic core is 60% by volume or more.

15. A method for manufacturing the soft magnetic powder according to claim 1, comprising pulverizing a molten metal of a mother alloy with a jet gas by a gas atomization process followed by water cooling to form the soft magnetic powder, and wherein a weight-basis value of a flower rate of the molten metal divided by a volumetric-basis flow rate of the jet gas is 0.2 g/L or more and 3.1 g/L or less.

16. The method according to claim 15, wherein the mother alloy comprises Fe as a main component; and a sum of contents of Fe, Co and Ni in the mother alloy is 72 atom % to 85 atom % where the contents of Co and/or Ni may be 0 atom %.

17. The method according to claim 15, wherein the jet gas comprises an inert gas.

18. A method for manufacturing the soft magnetic powder according to claim 1, comprising pulverizing a molten metal of a mother alloy with a jet gas by a gas atomization process to form the soft magnetic powder, and wherein a weight-basis value of a flow rate of the molten metal divided by a volumetric-basis flow rate of the jet gas is 0.2 g/L or more and 3.1 g/L or less;

wherein the mother alloy comprises Fe as a main component; and a sum of contents of Fe, Co and Ni in the mother alloy is 72 atom % to 85 atom % where the contents of Co and/or Ni may be 0 atom %.

19. The method according to claim 18, wherein the jet gas comprises an inert gas.

20. A method for manufacturing the soft magnetic powder according to claim 1, comprising pulverizing a molten metal of a mother alloy with a jet gas by a gas atomization process to form the soft magnetic powder, and wherein a weight-basis value of a flow rate of the molten metal divided by a volumetric-basis flow rate of the jet gas is 0.2 g/L or more and 3.1 g/L or less; and wherein the jet gas comprises an inert gas.

21. The method according to claim 20, wherein the jet gas comprises Ar and/or $N_2$.

22. The method according to claim 21, wherein the jet gas comprises $H_2$ of 0.5% to 7% in terms of partial pressure.

23. The method according to claim 20, wherein the jet gas comprises $H_2$ of 0.5% to 7% in terms of partial pressure.

* * * * *